US006543549B1

(12) United States Patent
Riedl et al.

(10) Patent No.: US 6,543,549 B1
(45) Date of Patent: Apr. 8, 2003

(54) ELECTRICALLY DRIVEN HAND-HELD TOOL

(75) Inventors: Reinhard Riedl, Finning (DE); Manfred Ludwig, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/566,258

(22) Filed: May 5, 2000

(30) Foreign Application Priority Data

May 28, 1999 (DE) ........................................ 199 24 552

(51) Int. Cl.[7] ................................................ H02K 11/00

(52) U.S. Cl. ................. 173/216; 173/171; 173/DIG. 2; 310/50

(58) Field of Search ................................ 173/217, 216, 173/170, 171, DIG. 2; 310/47, 50

(56) References Cited

U.S. PATENT DOCUMENTS 2,155,082 A * 4/1939 Decker ....................... 173/217
2,456,571 A * 12/1948 Turner et al. ............... 173/217
2,517,882 A * 8/1950 Johnson ...................... 173/217
2,976,436 A * 3/1961 Anton ........................ 173/217
3,718,193 A * 2/1973 Wanner ...................... 173/117
4,251,120 A * 2/1981 Wolff ......................... 173/217
6,325,157 B1 * 12/2001 Arakawa et al. ............ 173/117
2001/0052419 A1 * 12/2001 Quirijnen et al. ........... 173/217

* cited by examiner

*Primary Examiner*—Scott A. Smith
(74) *Attorney, Agent, or Firm*—Sidley Austin Brown & Wood, LLP

(57) ABSTRACT

An electrically driven hand-held tool including a housing (2; 12; 22; 32), an electromotor (20; 30; 40), a gear set for transmitting rotation of an output shaft of the electromotor to a drive spindle, and a fan-wheel all arranged in the housing (2; 12; 22; 32), with the fan-wheel providing, during operation of the tool, for aspiration of air through the suction openings (6; 16; 26; 36) formed in the housing for directing the aspirated air past the electromotor and the gear set for cooling same, and for expelling warm air, which was heated as a result of absorbing heat generated by the electromotor and the gear set during the operation of the tool, out of the housing (2; 12; 22; 32), and a warm air channel (7; 17; 27; 37) arranged downstream of the electromotor and the gear set and spaced from a tool handle (3; 13; 23; 33) and having a plurality of blow-out openings (8; 18; 28; 38) arranged in such a way that during use of the hand-held tool, the expelled warm air flows in a direction away from the tool operator.

6 Claims, 4 Drawing Sheets

ELECTRICALLY DRIVEN HAND-HELD TOOL

BACKGROUND OF THE INVENTION

1. Field of the Invention

The present invention relates to an electrically driven hand-held tool including a housing having a plurality of air suction openings, an electromotor, a gear set for transmitting rotation of an output shaft of the electromotor to a drive spindle, and a fan-wheel all arranged in the housing, with the fan-wheel providing, during operation of the tool, for aspiration of air through the suction openings for directing the aspirated air past the electromotor and the gear set for cooling the same, and for expelling warm air, which was heated as a result of absorbing heat generated by the electromotor and the gear set during the operation of the tool, out of the housing, and guide means for directing the warm air out of the housing.

2. Description of the Prior Art

In all of the conventional electrically driven hand-held tools, e.g., in screw-driving tools, the electromotor, which is arranged in the tool housing, is usually cooled by air. To this end, a fan is arranged in the housing the fan-wheel of which provides for aspiration of the air through suction openings formed in the housing. The aspirated air flows past the electromotor and the gear set provided in a drive train to the working tool. Then, the heated air is expelled back into atmosphere through blow-out openings formed in the housing. Usually, the warm air is expelled in a direction toward the tool operator which is extremely unpleasant in case the eyes of the operator are in vicinity of the blow-out openings. Further, during the operation of the tool, the air cooling is a continuous source of noise as the outgoing air transmits the noise, which is generated by the electromotor, the gear set, and, in particular, by the fan to the surrounding environment. The resulting, relatively high frequency acoustic oscillations are rather disturbing for the operator and the environment.

Accordingly, an object of the present invention is to eliminate the known drawbacks of the electrically drive hand-held tool.

Another object of the invention is to provide an electrically driven hand-held tool with which, even if the tool is held at a head height during its use, the outgoing warm air would not disturb the operator.

A further object of the invention is to provide an electrically driven hand-held tool in which the noise, which is generated by the electromotor, the gear set, and in particular, by the fan for suction of the cooling air, will be at least partially reduced.

SUMMARY OF THE INVENTION

These and other objects of the present invention, which will become apparent hereinafter, are achieved, by providing an electrically driven hand-held tool including a housing having a plurality of air suction openings, an electromotor, a gear set for transmitting rotation of an output shaft of the electromotor to a drive spindle, and a fan-wheel all arranged in the housing, with the fan-wheel providing, during operation of the tool, for aspiration of air through the suction openings, for directing the aspirated air past the electromotor and the gear set for cooling same, and for expelling warm air, which was heated as a result of absorbing heat generated by the electromotor and the gear set during the operation of the tool, out of the housing.

Downstream of the electromotor and the gear set, there is provided a warm air channel spaced from a tool handle and having a plurality of blow-out openings. The blow-out openings are arranged in such a way that during use of the hand-held tool, the expelled warm air flows in a direction away from the tool operator.

By providing a separate channel for the warm air, which is spaced from the handle, it became possible to so arrange the blow-out openings that during the use of the tool, the expelled warm air does not disturb the operator any more.

The additional channel for the warm air offers different advantageous possibilities for the tool design. E.g., in tools, in which the electromotor extends substantially vertically, with respect to the drive spindle axis, in the tool housing, the warm air channel is integrated in the housing. In this case, the blow-out openings are provided on the side of the housing remote from the handle. The warm air channel adjoins that section of the housing in which the electromotor is arranged. The handle is connected with the housing and forms with the housing section, in which the electromotor is arranged, a spade handle. The housing section, in which the electromotor is located, serves as a hand protecting member. Because the blow-out openings are provided on the side of the housing remote from the handle, the warm air is expelled in a direction away from the operator.

In the alternative embodiment, the electromotor is arranged in the housing, with respect to the drive spindle axis, substantially horizontally. Such an arrangement is used in a majority of the known hand-held tool. In this case, the warm air channel is formed in a hand protecting part that extends from the housing to the handle in a spaced relationship to the handle. The blow-out openings are again provided on the side of the hand protecting part remote from the handle. The arrangement of the blow-out openings on the side of the hand protecting part remote from the handle prevents the warm air from reaching the operator.

In one embodiment of the inventive hand-held tool with a horizontally arranged, with respect to the drive spindle axis, electromotor, the hand protecting part is formed as a separate part releasably connectable with the housing. The hand-protecting part has, at its end connectable with the housing, two spaced cheeks extendable on opposite sides of the housing. Upon connecting the hand protection part with the housing, the cheeks cover the air outlet openings which are provided on opposite sides of the housing. Openings in the cheeks provide for flow of the warm air into the warm air channel and to the blow-out openings. With the hand-protecting part being removed, the hand-held tool is similar to a conventional hand-held tool. With the pinned-up hand protecting part, guiding of the warm air away from an operator is insured. The hand protecting part can be formed as a complementary part to a conventional hand-held tool. According to a preferred embodiment of a hand-held tool according to the present invention, the hand-protecting part can be formed of two sections, a first stirrup-like section which, preferably, is fixedly connected with the tool housing, and a second pin-up section releasably connectable with the first section, with the warm air channel being formed in the second, pin-up section.

With a hand-held tool according to the present invention, there exists a possibility to provide, at least in a portion of the warm air channel, noise suppression means which permits to at least partially reduce the noise generated by the electromotor, the gear set, and in particular, by the fan.

In a relatively easy, from the manufacturing point of view, producible embodiment of a hand-held tool according to the present invention, the noise suppression means is formed as baffle plates projecting from the inner wall of the warm air channel. The warm air channel is formed of two half-shells connectable with each other. Advantageously, the half-shells are produced, at their mass production, by an injection-molding process. The warm air channel can be also integrated in the tool housing at the mass production of the tool housings which usually are also formed of two half-shells.

In an embodiment of the hand-held tool according to the present invention characterized by a high degree of noise suppression, at least a section of the warm air channel is provided with noise-absorbing material. The noise-absorbing material can, e.g., be provided in a cartridge securable in the warm air channel. The warm air flows through the cartridge.

The noise-absorbing material suppresses the accompanying sound waves. The cartridge usually has a cylindrical shape, whereby the path the warm air has to pass is extended, which improves the noise suppression action of the cartridge.

As a noise absorbing material, steel wool, mineral fibers or floculant cellular material can be used. In case a cellular material is used, it can be arranged on the inner wall of the warm air channel in form of a coating.

Because the suction openings are formed in the section of the housing spaced from a workpiece by a most possible distance, the foreign bodies produced during the tool use are prevented from being aspirated into the housing with the cooling air.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
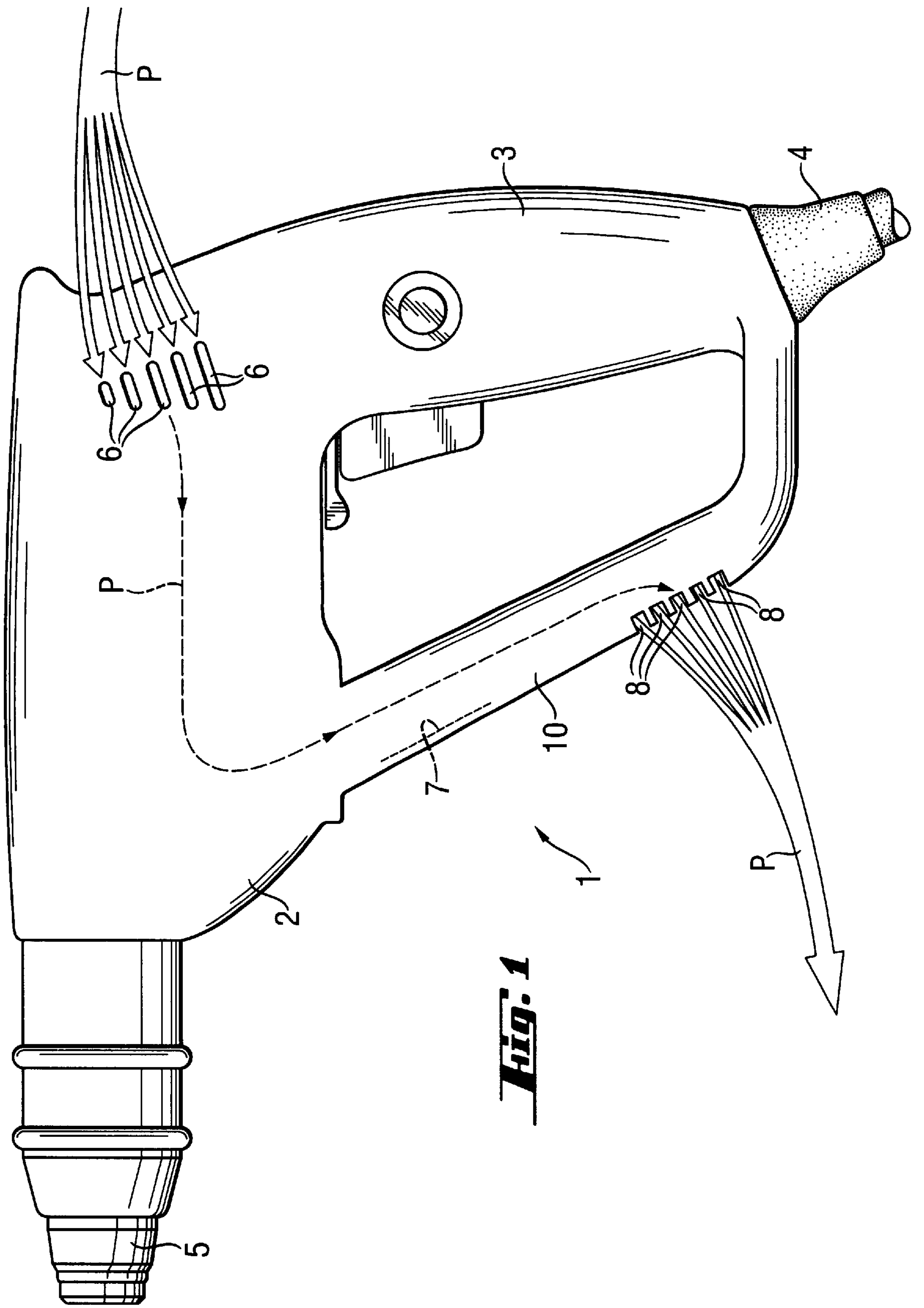
FIG. 1 a side view of a first embodiment of an electrically driven hand-held tool according to the present invention.
Figure 2:
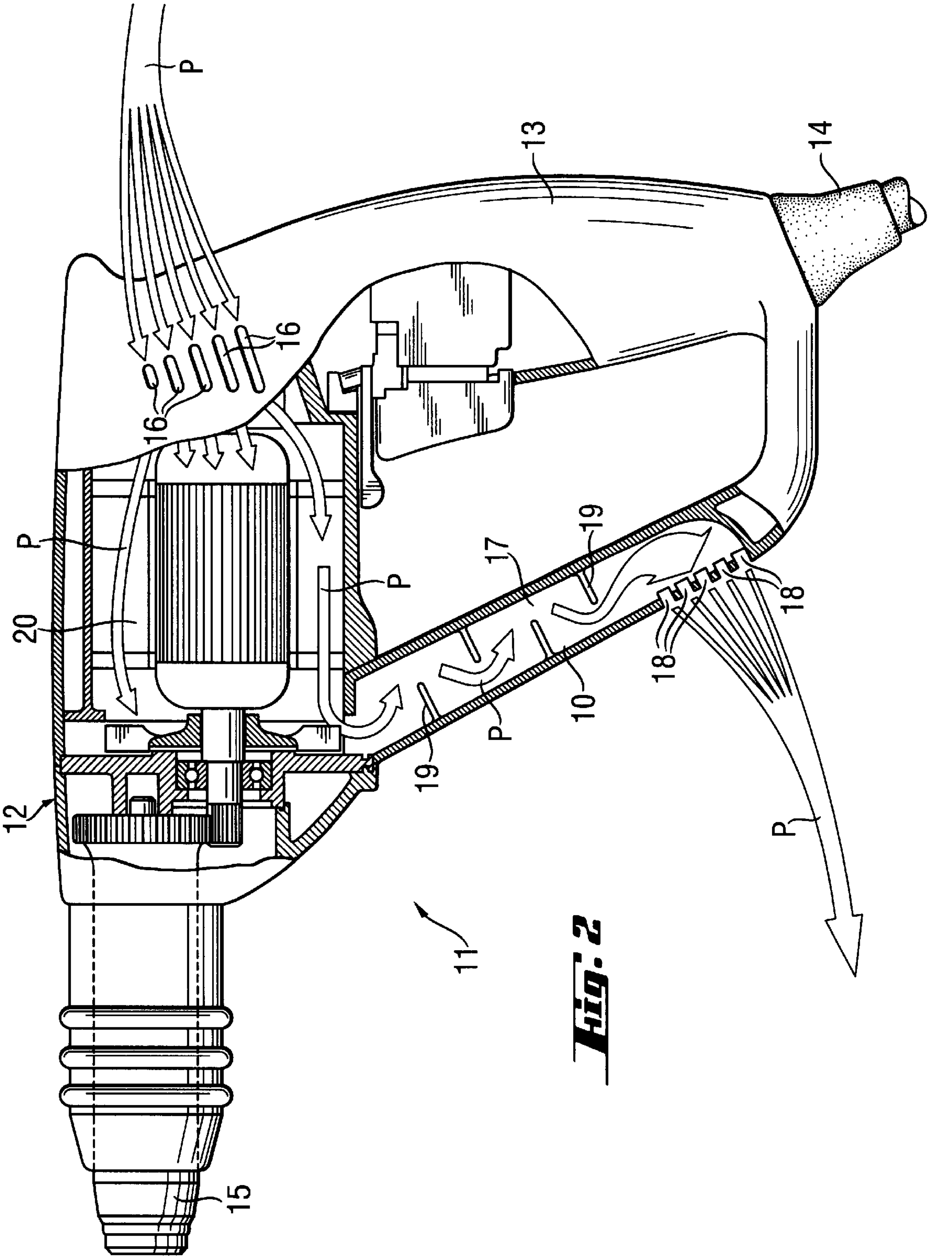
FIG. 2 a cross-sectional view of the tool shown in FIG. 1.
Figure 3:
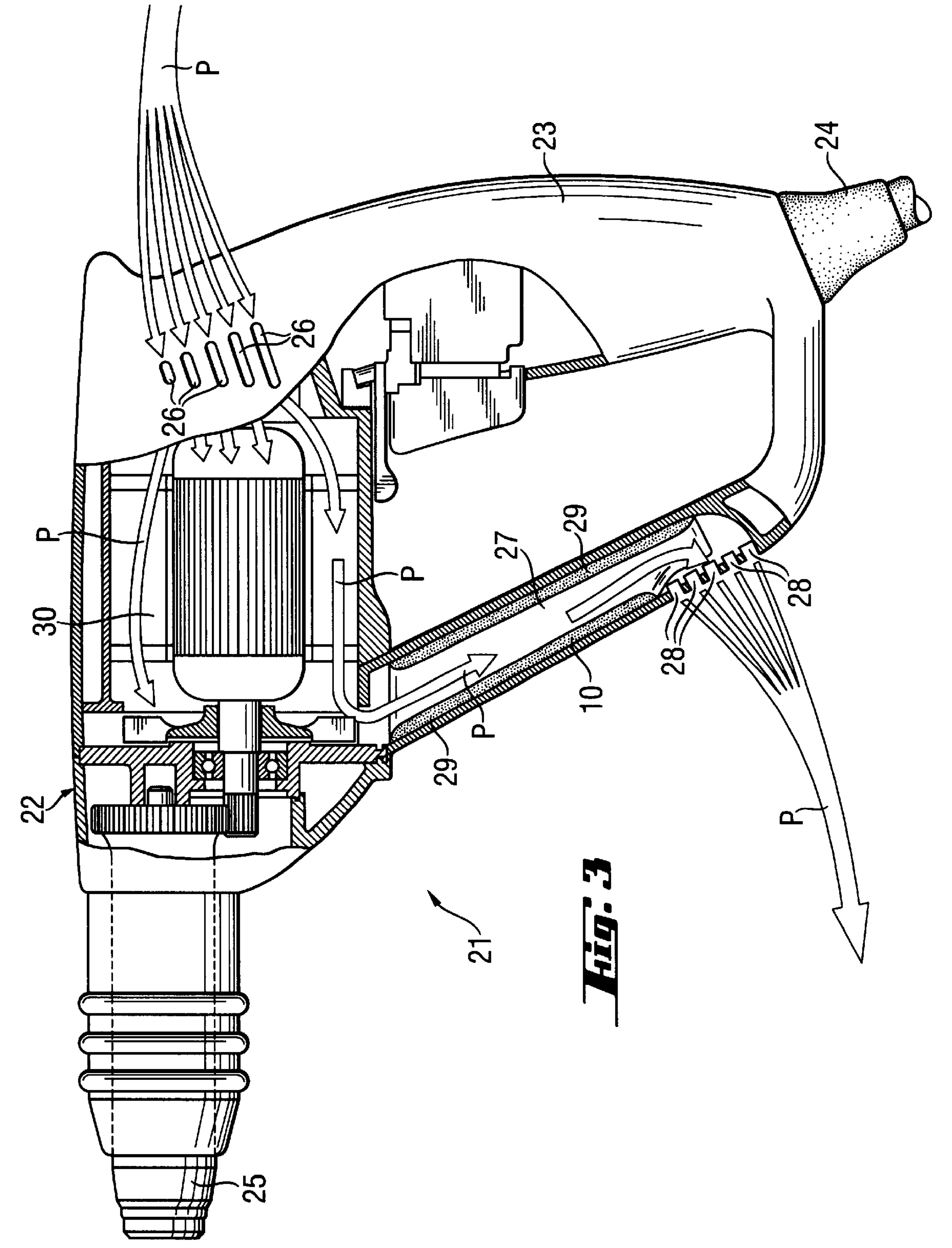
FIG. 3 a cross-sectional view of another embodiment of an electrically driven hand-held tool according to the present invention.
Figure 4:
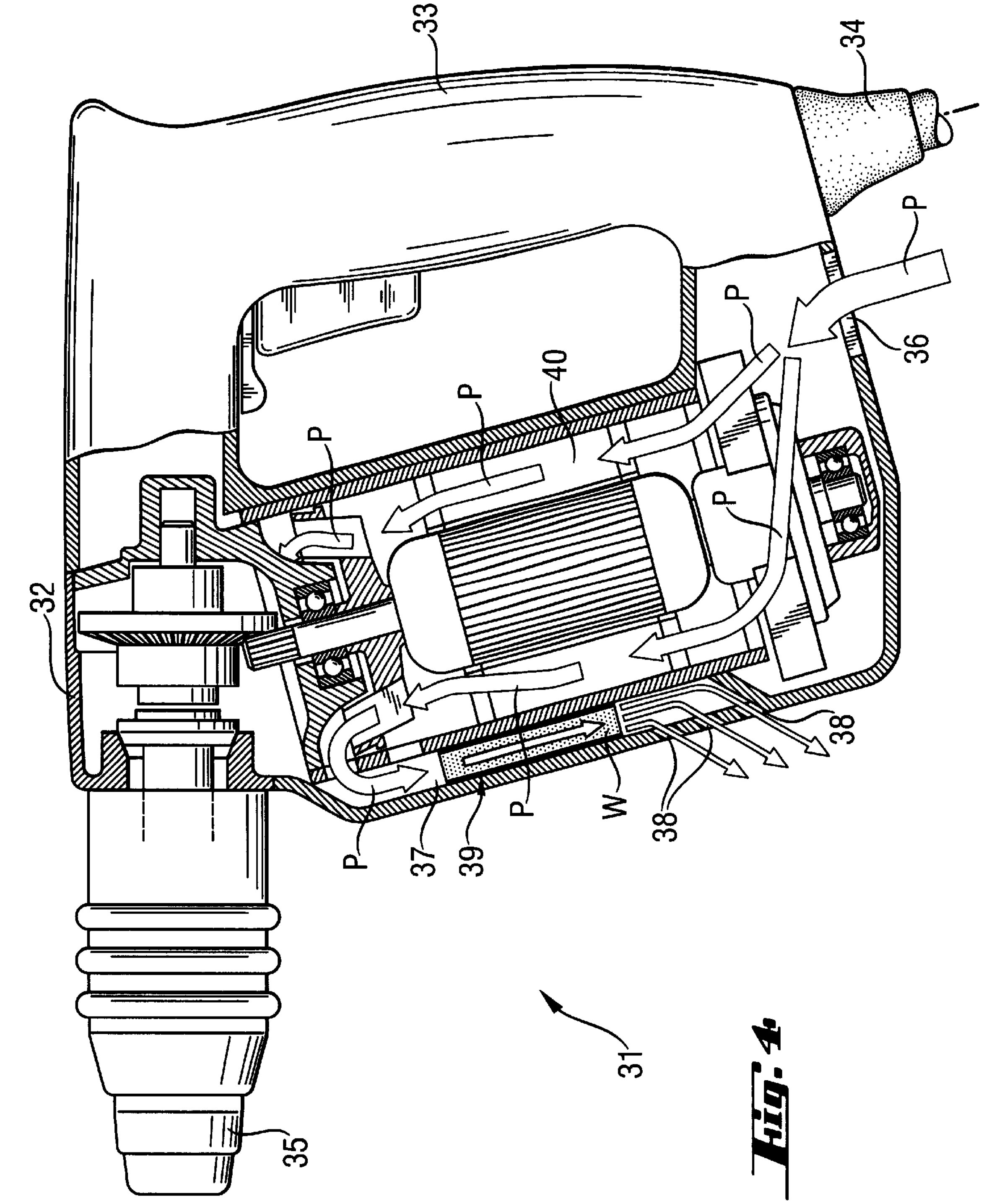
FIG. 4 a cross-sectional view of a further embodiment of an electrically driven hand-held tool according to the present invention.

An electrically driven hand-held tool, which is shown in FIGS. 1–4, is represented by an electrical screw driving tool. However, it should be understood that the basic features of the present invention, which will be discussed below, are applicable to other types of electrically driven hand-held tools. The embodiments of the inventive electrically driven hand-held tool, which are shown in FIGS. 1–3, include a horizontal built-in electrical drive motor. The inventive hand-held tool, which is shown in FIG. 4, includes a substantially vertical electric motor arranged within the tool.

An electrical screw driving tool, 1, a side view of which is shown in FIG. 1, includes a housing 2 connected with a handle 3. The handle 3 can be formed as a separate component that can be screwed with the housing 2, or be formed integrally with the housing 2. Conventionally, the housing 2 and the handle 3 are formed of, e.g., two half-shells produced, e.g., by an injection-molding process and screwed with each other after the necessary components have been mounted within the respective shells. An electromotor is mounted inside the housing and is connected with a rotatable spindle by a gear set. The spindle has a portion projecting from the housing and connected with a chuck 5 for receiving an appropriate tool. The electromotor, which is located in the housing 2, is supplied with electrical energy, e.g., via a connection cable 4. In different embodiments of the inventive hand-held tool, the electromotor can be fed with an electrical current from a battery or an accumulator. In these tools, which can operate independent of the electrical network, a need in a connection cable is eliminated.

The electromotor and the gear set are cooled by air. To this end, air suction openings 6 are formed in the housing 2 of the tool 1. The openings 6 provide for the suction of air into the housing and its flow to the electromotor and the gear set. To provide for the necessary air flow, a fan-wheel is arranged in the housing 2. The fan-wheel is connected with the electromotor. The location of the suction openings is so selected that they are spaced from the work piece as much as possible. Thereby, during the operation of the tool, the suction of foreign bodies inside the tool housing 2 is prevented. The heated air is not immediately expelled form the housing 2 but is conducted through an air channel 7 that extends in a hand protecting member 10 connecting the housing 2 with the handle 3. The hand protecting member 10 has, at a side thereof remote from the handle 3, a plurality of blow-out openings 8 through which the warm air is expelled. Arrows P show the direction of flow of the cooling air and of the warm air. The hand protecting member 10 can be formed, as shown in FIG. 1, integrally with the housing 2. According to another, advantageous embodiment of hand-held tool according to the present invention, the hand protecting member can be formed as a separate part pinned-up to the tool housing.

In the embodiment of an inventive hand-held tool shown in FIG. 2, the parts similar to those of FIG. 1 are designated with reference numerals increased by 10 in comparison with the reference numerals the parts of the tool shown in FIG. 1 are designated. The electromotor is designated by a reference numeral 20. The hand protecting member is designated with the reference numeral 10 in the same way as the hand protecting member in FIG. 1. In the warm air channel 17, there are provided baffle plates 19 projecting from the inner wall of the hand protecting member 10. The baffle plates 19 prevents the warm air from being expelled immediately through the blow-out openings 18 but create a curved path for the warm air. Thereby, a certain noise abatement is insured. Again, air flow is shown with arrows P.

The basic design of a hand-held tool 21, which is shown in FIG. 3, approximates that of the tool 11 shown in FIG. 2 to the most possible extent. The parts of the hand-held tool shown in FIG. 3 similar to those of the tool shown in FIG. 2 are designated with reference numerals increased by 10 in comparison with the reference numerals of the parts of the tool shown in FIG. 2. The electromotor is designated with a reference numeral 30. The hand protecting member again has the same reference numerals as in the tools shown in FIGS. 1–2, i.e., the reference numeral 10. In distinction from the embodiment of the tool shown in FIG. 2, no baffle plates are provided in the warm air channel 27. Instead, the inner wall of the warm air channel 7 is coated with a noise suppressing coating 29. The coating 29 can be formed, e.g., of a mass of a cellular material based, e.g., on polyurethane or polyethylene. As a polyurethane cellular material permanently elastic high-resilient foam and flocculation foam can be used. The coating can be formed by heat treatment or by injection coating. The noise suppression coating can be formed as a sandwich construction from noise suppressing industrial materials such as, e.g., used in motor vehicles. The coating 29 absorbs, upon the flow of the warm air through the channel 27, a larger portion of noise generated, by the electromotor 30, by the drive, or by the fan-wheel. As in the embodiments shown in FIGS. 1–2, the blow-out openings 28 are provided on a side of the hand protecting member 10 remote from the handle 23. The flow of air into the housing 22, through the housing 22, and through the channel 27 again is shown with arrows P.

FIG. 4 shows an embodiment of the inventive hand-held tool 31 with a substantially vertically arranged electromotor 40. The handle 33 is connected with the housing 32 and forms with a portion of the housing 32, in which the electromotor 40 is located, a so-called spade handle. The supply of electrical energy to the electromotor 40 is effected through a connection cable 34. The rotation of the output shaft of the electromotor 40 is transmitted to the drive spindle, which is connected with a working tool-receiving chuck 35, via a gear set, not shown in detail. The chuck 35 can be designed for receiving, e.g., a screw driver or a drill. The cooling air is aspirated through air suction openings 36 formed in the bottom part of the housing 32, in the region of the guide for the connection cable 34. The location of the suction openings 36 insures that no foreign bodies are aspirated into the housing 32 during the operation of the tool 31. The aspirated air is passed over the electromotor 40 and the gear set to cool both. The air flow is shown with arrows P. After cooling the electromotor 40 and the gear set, the warm air passes into the warm air channel 37 provided on the side of the electromotor—receiving housing part remote from the handle 33. A cartridge 39 is arranged in the warm air channel 37 and is fixed there, e.g., with a clamp. The cartridge 39 is filled with a noise-absorbing material W. As a noise-absorbing material W, e.g., steel wool, mineral fibers, or foam or cellular materials can be used. The cartridge 39 has a cylindrical shape. The warm air, after passing through cartridge 39, is expelled through the blow-out openings 38. The blow-out openings 38 are provided on the side of the electromotor-receiving housing part remote from the handle 33.

With a hand-held tool according to the present invention, operator is not any more irritated by the expelled warm air. Furthermore, providing an additional warm air channel permitted to reduce the noise load generated during the operation of the tool. The different ways of noise suppression, which were discussed above in connection with the description of different embodiments of the present invention, can be combined. E.g., in addition to providing baffle plates in the warm air channel, its inner wall can be coated with a noise suppression coating. The baffle plates can also be combined with the noise-absorbing cartridge. The hand protecting member can be formed integrally with the tool housing. Alternatively, the hand protecting member can be formed as a separate part releasably connectable with the tool housing.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An electrically driven hand-held tool, comprising a housing (2; 12; 22; 32) having a plurality of air suction openings (6; 16; 26; 36), and electromotor (20; 30; 40), a gear set for transmitting rotation of an output shaft of the electromotor to a drive spindle, and a fan-wheel all arranged in the housing (2; 12; 22; 32), the fan-wheel providing, during operation of the tool, for aspiration of air through the suction openings (6; 16; 26; 36), for directing the aspirated air past the electromotor and the gear set for cooling same, and for expelling warm air, which was heated as a result of absorbing heat generated by the electromotor and the gear set during the operation of the tool, out of the housing (2; 12; 22; 32); and means for directing the warm air out of the housing (2; 12; 22; 32); the directing means comprising a warm air channel (7; 17; 27; 37) arranged downstream of the electromotor and the gear set and spaced from a tool handle (3; 13; 23; 33) and having a plurality of blow-out openings (8; 18; 28; 38) arranged in such a way that during use of the hand-held tool, the expelled warm air flows in a direction away from the tool operator.

2. A hand-held tool according to claim 1, wherein the electromotor (20; 30) is arranged in the housing substantially horizontally, with respect to a drive spindle axis, and wherein the tool further comprises a hand protecting member (10) spaced from the tool handle (3; 13; 23) and extending from the housing (2; 12; 22) to the handle (3; 13; 23), the warm air channel (7; 17; 27) is provided in the hand protecting member (10), and the blow-out openings (8; 18; 28) are provided on a side of the hand protecting member (10) remote from the handles (3; 13; 23).

3. A hand-held tool according to claim 2, wherein the hand protecting member is formed as a separate part releasably connected with the housing.

4. A hand-held tool according to claim 1, wherein the warm air channel (17; 27; 37) is provided at least partially, with noise suppression means.

5. A hand-held tool according to claim 4, wherein the noise suppression means comprises baffle plates (19) projecting from an inner wall of the warm air channel (17).

6. A hand-held tool according to claim 1, wherein the air suction openings (6; 16; 26; 36) are formed in a section of the housing (2; 12; 22; 30) which, during an intended use of the tool, is spaced from a workpiece by a largest possible distance.

* * * * *